US012800841B2

(12) United States Patent
Kamata et al.

(10) Patent No.: US 12,800,841 B2
(45) Date of Patent: Nov. 17, 2026

(54) OPTICAL ANTENNA AND OPTICAL ANTENNA ARRAY

(71) Applicants: DENSO CORPORATION, Kariya-city (JP); TOYOTA JIDOSHA KABUSHIKI KAISHA, Toyota (JP); MIRISE Technologies Corporation, Nisshin (JP)

(72) Inventors: Yuki Kamata, Nisshin (JP); Toshihiro Oda, Nisshin (JP)

(73) Assignees: DENSO CORPORATION, Kariya-city (JP); TOYOTA JIDOSHA KABUSHIKI KAISHA, Toyota (JP); MIRISE Technologies Corporation, Nisshin (JP)

( * ) Notice: Subject to any disclaimer, the term of this patent is extended or adjusted under 35 U.S.C. 154(b) by 304 days.

(21) Appl. No.: 18/415,910

(22) Filed: Jan. 18, 2024

(65) Prior Publication Data

US 2024/0385383 A1 Nov. 21, 2024

(30) Foreign Application Priority Data

May 19, 2023 (JP) ................................ 2023-082979

(51) Int. Cl.
*G02B 6/34* (2006.01)
*G01S 7/481* (2006.01)

(52) U.S. Cl.
CPC .............. *G02B 6/34* (2013.01); *G01S 7/4817* (2013.01)

(58) Field of Classification Search
CPC ..................................................... G01S 7/4817
See application file for complete search history.

(56) References Cited

U.S. PATENT DOCUMENTS 5,033,812 A * 7/1991 Yoshida ................. G02B 6/124 385/37
5,315,676 A * 5/1994 Sunagawa ................ G02B 6/34 385/37
7,260,293 B1 * 8/2007 Gunn, III ............... G02B 6/124 385/37
9,057,844 B2 * 6/2015 Doany ..................... G02B 6/34
(Continued)

OTHER PUBLICATIONS

S. Dwivedi et al., "Calibration-free Si—SiN Optical Phased Array" Advanced Photonics Congress (IPR, Networks, NOMA, PVLED, SPPCom) OSA 2019, Belgium.

*Primary Examiner* — Peter Radkowski
(74) *Attorney, Agent, or Firm* — Posz Law Group, PLC

(57) ABSTRACT

An optical antenna includes a waveguide for propagating light, when a direction in which the waveguide extends is defined as a first direction, a direction perpendicular to the first direction is defined as a second direction, and a direction perpendicular to both the first direction and the second direction is defined as a third direction, a first diffraction grating group having a plurality of first diffraction gratings arranged at a predetermined period in the first direction on both sides of the waveguide in the second direction, and a second diffraction grating group having a plurality of second diffraction gratings arranged at a same period as the first diffraction grating in the first direction on both sides of the waveguide in the second direction. The first diffraction grating and the second diffraction grating have different centroid positions in the first direction and the third direction.

10 Claims, 8 Drawing Sheets

(56) References Cited

U.S. PATENT DOCUMENTS

| | | | | |
|---|---|---|---|---|
| 9,091,819 | B2 * | 7/2015 | Doany | G02B 6/4214 |
| 10,338,321 | B2 * | 7/2019 | Hosseini | H04Q 11/0005 |
| 10,365,434 | B2 * | 7/2019 | Wang | G01N 21/6486 |
| 10,436,990 | B2 * | 10/2019 | Bruck | G02B 6/12004 |
| 10,466,100 | B2 * | 11/2019 | Cho | G01J 3/021 |
| 10,514,509 | B2 * | 12/2019 | Popovic | G02B 6/34 |
| 10,527,906 | B2 * | 1/2020 | Poulton | G02F 1/0147 |
| 10,613,410 | B2 * | 4/2020 | Hosseini | G02F 1/292 |
| 10,649,306 | B2 * | 5/2020 | Skirlo | G02F 1/3136 |
| 10,684,527 | B2 * | 6/2020 | Watts | G02B 6/1223 |
| 10,690,993 | B2 * | 6/2020 | Timurdogan | G02F 1/2955 |
| 10,705,407 | B2 * | 7/2020 | Hosseini | G02B 27/48 |
| 10,707,837 | B2 * | 7/2020 | Poulton | H03H 11/22 |
| 10,712,513 | B2 * | 7/2020 | Bruck | H04B 10/66 |
| 10,761,272 | B2 * | 9/2020 | Hosseini | G01S 7/4814 |
| 10,790,585 | B2 * | 9/2020 | Poulton | G02F 1/2955 |
| 10,809,591 | B2 * | 10/2020 | Watts | G02B 6/29331 |
| 10,852,492 | B1 * | 12/2020 | Vermeulen | G02B 6/423 |
| 10,883,874 | B2 * | 1/2021 | Cho | G01J 3/18 |
| 10,884,312 | B2 * | 1/2021 | Watts | G02B 6/29331 |
| 10,976,542 | B2 * | 4/2021 | Russo | G02B 27/0087 |
| 10,983,275 | B2 * | 4/2021 | Popovic | G02B 6/305 |
| 11,003,045 | B2 * | 5/2021 | Hosseini | G02F 1/292 |
| 11,054,576 | B2 * | 7/2021 | Wang | G02B 6/124 |
| 11,061,140 | B2 * | 7/2021 | Hosseini | G01S 7/4813 |
| 11,079,653 | B2 * | 8/2021 | Watts | G02B 6/1223 |
| 11,079,654 | B2 * | 8/2021 | Watts | G02F 1/225 |
| 11,150,411 | B2 * | 10/2021 | Hosseini | G01S 17/42 |
| 11,215,770 | B2 * | 1/2022 | Bruck | G02B 6/136 |
| 11,243,296 | B2 * | 2/2022 | Byrd | G01S 7/4817 |
| 11,249,254 | B2 * | 2/2022 | Su | G02B 6/2935 |
| 11,269,236 | B2 * | 3/2022 | Timurdogan | G02F 1/335 |
| 11,353,769 | B2 * | 6/2022 | Hosseini | G01S 17/42 |
| 11,360,278 | B2 * | 6/2022 | Doerr | G02B 6/428 |
| 11,385,410 | B2 * | 7/2022 | Lipson | G02B 6/124 |
| 11,409,044 | B2 * | 8/2022 | Su | G02B 6/2773 |
| 11,409,059 | B1 * | 8/2022 | Vermeulen | G02B 6/4251 |
| 11,422,431 | B2 * | 8/2022 | Hosseini | G02F 1/225 |
| 11,448,823 | B1 * | 9/2022 | Doerr | G01S 17/10 |
| 11,509,116 | B2 * | 11/2022 | Vermeulen | H01S 5/141 |
| 11,525,915 | B2 * | 12/2022 | Russo | G01S 7/4918 |
| 11,526,063 | B2 * | 12/2022 | Watts | G02B 6/29331 |
| 11,536,908 | B2 * | 12/2022 | Puckett | G02B 6/34 |
| 11,579,370 | B2 * | 2/2023 | Hosseini | G02B 6/3526 |
| 11,604,397 | B2 * | 3/2023 | Hosseini | G02F 1/292 |
| 11,619,718 | B2 * | 4/2023 | Hosseini | G01S 7/4817<br>356/5.01 |
| 11,693,182 | B2 * | 7/2023 | Wang | G01N 21/648<br>385/37 |
| 11,714,238 | B2 * | 8/2023 | Su | H04J 14/0209<br>398/139 |
| 11,719,885 | B2 * | 8/2023 | Kuo | G02B 6/124<br>385/37 |
| 11,726,260 | B2 * | 8/2023 | Wang | G02B 6/124<br>385/37 |
| 11,754,784 | B2 * | 9/2023 | Ling | G02B 6/124<br>385/43 |
| 11,762,145 | B2 * | 9/2023 | Kuo | G02B 6/12007<br>385/129 |
| 11,768,418 | B2 * | 9/2023 | Watts | G02F 1/292<br>385/3 |
| 11,809,058 | B2 * | 11/2023 | Watts | G02B 6/29331 |
| 11,822,136 | B2 * | 11/2023 | Bruck | G02B 6/34 |
| 11,853,870 | B2 * | 12/2023 | Shen | G02F 1/212 |
| 11,860,422 | B2 * | 1/2024 | Hosseini | G02B 6/3558 |
| 11,892,690 | B1 * | 2/2024 | Doerr | G02B 6/30 |
| 11,940,621 | B2 * | 3/2024 | Watts | G02B 27/0087 |
| 11,953,678 | B2 * | 4/2024 | Russo | G02B 27/0087 |
| 11,960,006 | B2 * | 4/2024 | Hosseini | G01S 7/4817 |
| 11,960,192 | B2 * | 4/2024 | Watts | G02F 1/225 |
| 11,965,966 | B1 * | 4/2024 | Doerr | G02B 6/12016 |
| 11,988,531 | B2 * | 5/2024 | Hua | G01D 5/26 |
| 12,007,607 | B2 * | 6/2024 | Hosseini | H04Q 11/0005 |
| 12,061,260 | B2 * | 8/2024 | Russo | G01S 7/4815 |
| 12,066,662 | B2 * | 8/2024 | Kuo | G02B 6/29325 |
| 12,072,531 | B2 * | 8/2024 | Su | G02B 6/2726 |
| 12,169,304 | B2 * | 12/2024 | Wang | G02B 6/124 |
| 12,313,953 | B2 * | 5/2025 | Hosseini | G02F 1/292 |
| 12,353,010 | B2 * | 7/2025 | Wang | G01N 21/6452 |
| 12,474,528 | B2 * | 11/2025 | Hosseini | G02B 6/3512 |
| 2014/0193115 | A1 * | 7/2014 | Popovic | G02B 6/124<br>385/14 |
| 2014/0304971 | A1 * | 10/2014 | Doany | G02B 6/4214<br>427/446 |
| 2014/0308004 | A1 * | 10/2014 | Doany | G02B 6/4214<br>427/446 |
| 2016/0124164 | A1 * | 5/2016 | Doerr | G02B 6/428<br>385/14 |
| 2016/0238447 | A1 * | 8/2016 | Cho | G01J 3/0224 |
| 2016/0363728 | A1 * | 12/2016 | Wang | G02B 6/34 |
| 2017/0269297 | A1 * | 9/2017 | Popovic | G02B 6/34 |
| 2017/0315387 | A1 * | 11/2017 | Watts | G02F 1/292 |
| 2017/0315420 | A1 * | 11/2017 | Watts | G02F 1/225 |
| 2018/0107091 | A1 * | 4/2018 | Hosseini | G02F 1/292 |
| 2018/0217472 | A1 * | 8/2018 | Poulton | G02F 1/0147 |
| 2018/0267250 | A1 * | 9/2018 | Hosseini | G02B 6/3556 |
| 2018/0306925 | A1 * | 10/2018 | Hosseini | G02B 27/286 |
| 2018/0306986 | A1 * | 10/2018 | Bruck | G02B 6/30 |
| 2018/0348592 | A1 * | 12/2018 | Hosseini | G01S 17/42 |
| 2018/0364336 | A1 * | 12/2018 | Hosseini | G01S 7/4814 |
| 2019/0013798 | A1 * | 1/2019 | Poulton | H03H 11/22 |
| 2019/0056634 | A1 * | 2/2019 | Hosseini | G02F 1/292 |
| 2019/0094651 | A1 * | 3/2019 | Timurdogan | G02F 1/335 |
| 2019/0212627 | A1 * | 7/2019 | Watts | G02B 6/1223 |
| 2019/0219423 | A1 * | 7/2019 | Hua | G01D 5/268 |
| 2019/0219884 | A1 * | 7/2019 | Watts | G02F 1/025 |
| 2019/0219885 | A1 * | 7/2019 | Watts | G02B 6/29331 |
| 2019/0219886 | A1 * | 7/2019 | Watts | G02B 6/29331 |
| 2019/0235233 | A1 * | 8/2019 | Russo | G02B 27/0087 |
| 2019/0260123 | A1 * | 8/2019 | Poulton | G02F 1/2955 |
| 2019/0265574 | A1 * | 8/2019 | Skirlo | G02F 1/3136 |
| 2019/0324214 | A1 * | 10/2019 | Hosseini | G02B 6/3526 |
| 2020/0018646 | A1 * | 1/2020 | Cho | G01J 3/0205 |
| 2020/0049882 | A1 * | 2/2020 | Wang | G02B 6/34 |
| 2020/0057211 | A1 * | 2/2020 | Bruck | H04B 10/25891 |
| 2020/0127432 | A1 * | 4/2020 | Vermeulen | G02B 27/4233 |
| 2020/0158956 | A1 * | 5/2020 | Lipson | G02B 5/1809 |
| 2020/0217961 | A1 * | 7/2020 | Russo | G01S 7/4911 |
| 2020/0292913 | A1 * | 9/2020 | Timurdogan | G02F 1/335 |
| 2020/0319409 | A1 * | 10/2020 | Su | H04J 14/0209 |
| 2020/0319524 | A1 * | 10/2020 | Hosseini | G02B 27/48 |
| 2020/0341216 | A1 * | 10/2020 | Bruck | G02B 6/30 |
| 2020/0379185 | A1 * | 12/2020 | Hosseini | G01S 7/4817 |
| 2020/0393737 | A1 * | 12/2020 | Hosseini | G02F 1/225 |
| 2021/0026216 | A1 * | 1/2021 | Watts | G02B 6/29331 |
| 2021/0033788 | A1 * | 2/2021 | Wang | G01N 21/774 |
| 2021/0223544 | A1 * | 7/2021 | Russo | G02F 1/2955 |
| 2021/0263389 | A1 * | 8/2021 | Hosseini | G02F 1/292 |
| 2021/0318442 | A1 * | 10/2021 | Hosseini | G01S 7/4814 |
| 2021/0325762 | A1 * | 10/2021 | Lee | G02F 1/292 |
| 2021/0333682 | A1 * | 10/2021 | Watts | G02F 1/025 |
| 2021/0341675 | A1 * | 11/2021 | Su | G02B 6/126 |
| 2021/0356835 | A1 * | 11/2021 | Watts | G02F 1/292 |
| 2022/0003937 | A1 * | 1/2022 | Hosseini | G02B 6/3534 |
| 2022/0075186 | A1 * | 3/2022 | Watts | G02B 26/08 |
| 2022/0082767 | A1 * | 3/2022 | Bruck | G02B 6/122 |
| 2022/0099886 | A1 * | 3/2022 | Wang | G02B 6/124 |
| 2022/0113389 | A1 * | 4/2022 | Hosseini | G01S 17/42 |
| 2022/0113473 | A1 * | 4/2022 | Kuo | G02B 6/4206 |
| 2022/0120968 | A1 * | 4/2022 | Kuo | G02B 6/29325 |
| 2022/0137299 | A1 * | 5/2022 | Su | H04J 14/0307<br>385/24 |
| 2022/0146903 | A1 * | 5/2022 | Watts | H04B 10/1123 |
| 2022/0252792 | A1 * | 8/2022 | Puckett | G02B 27/1093 |
| 2022/0334313 | A1 * | 10/2022 | Su | G02B 6/2766 |
| 2022/0343149 | A1 * | 10/2022 | Su | G02B 6/4206 |
| 2023/0052542 | A1 * | 2/2023 | Russo | G01S 17/32 |
| 2023/0058824 | A1 * | 2/2023 | Watts | G02F 1/225 |
| 2023/0074516 | A1 * | 3/2023 | Ling | G02B 6/1228 |
| 2023/0146495 | A1 * | 5/2023 | Hosseini | H04Q 11/0005<br>398/45 |
| 2023/0152525 | A1 * | 5/2023 | Hosseini | G02B 6/3558<br>398/45 |

(56) References Cited

U.S. PATENT DOCUMENTS

| | | | | |
|---|---|---|---|---|
| 2023/0236471 | A1* | 7/2023 | Hosseini | G02F 1/292<br>385/37 |
| 2023/0314709 | A1* | 10/2023 | Wang | G02B 6/124<br>385/37 |
| 2023/0324615 | A1* | 10/2023 | Kuo | G02B 6/29325<br>385/37 |
| 2024/0184046 | A1* | 6/2024 | Wang | G02B 6/34 |
| 2024/0231082 | A1* | 7/2024 | Russo | G02F 1/2955 |
| 2024/0329324 | A1* | 10/2024 | Hosseini | G02B 6/3556 |

* cited by examiner

OPTICAL ANTENNA AND OPTICAL ANTENNA ARRAY

CROSS REFERENCE TO RELATED APPLICATIONS

The present application is based on Japanese Patent Application No. 2023-82979 filed on May 19, 2023, the description of which is incorporated herein by reference.

TECHNICAL FIELD

The present disclosure relates to an optical antenna and an optical antenna array.

BACKGROUND

An optical scanning device used for LiDAR (Light Detection And Ranging) or the like includes a light source, a waveguide for propagating an output light from the light source, and an optical antenna for emitting light to an outside of the waveguide.

SUMMARY

An object of the present disclosure is to provide an optical antenna and an optical antenna array with high emission efficiency.

In order to achieve the above object, according to one aspect of the present disclosure, an optical antenna includes a waveguide for propagating light, when a direction in which the waveguide extends is defined as a first direction, a direction perpendicular to the first direction is defined as a second direction, and a direction perpendicular to both the first direction and the second direction is defined as a third direction, a first diffraction grating group having a plurality of first diffraction gratings arranged at a predetermined period in the first direction on both sides of the waveguide in the second direction, and a second diffraction grating group having a plurality of second diffraction gratings arranged at a same period as the first diffraction grating in the first direction on both sides of the waveguide in the second direction. The first diffraction grating and the second diffraction grating have different centroid positions in the first direction and the third direction, and the second diffraction grating is located closer to the waveguide than the first diffraction grating in the second direction.

DETAILED DESCRIPTION

Figure 1:
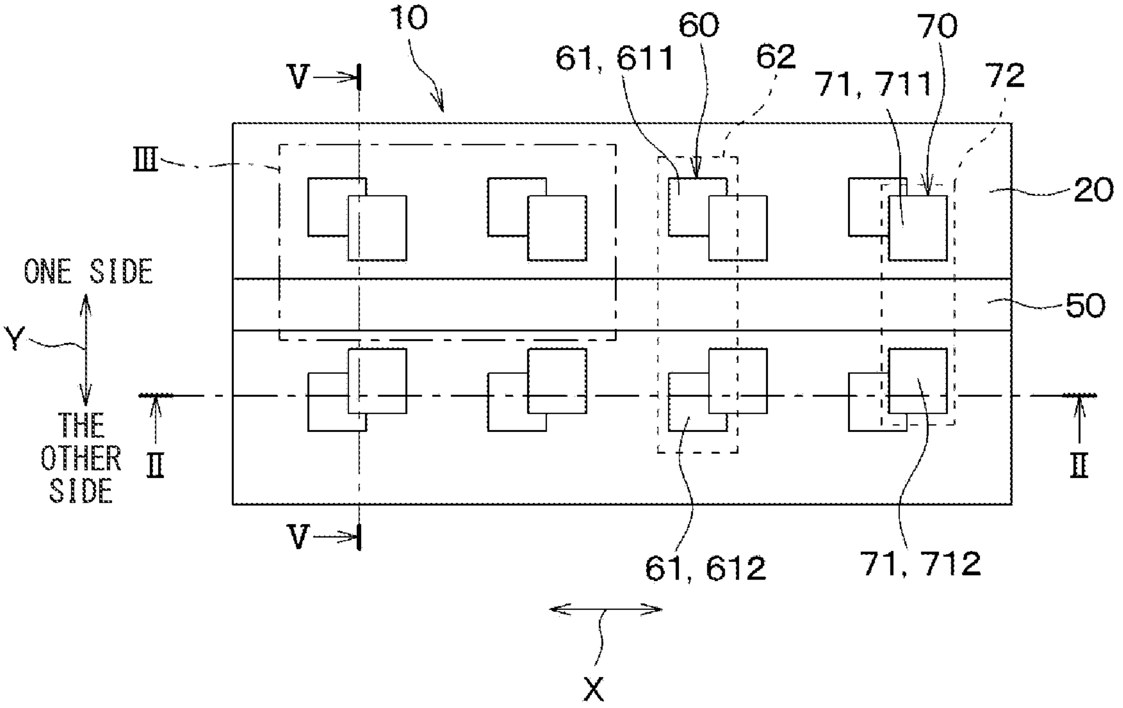
FIG. 1 is a top view of an optical antenna according to a first embodiment.

In an assumable example, an optical scanning device used for LiDAR (Light Detection And Ranging) or the like includes a light source, a waveguide for propagating an output light from the light source, and an optical antenna for emitting light to an outside of the waveguide. The optical antenna includes a substrate, a lower cladding layer and an upper cladding layer laminated on the substrate, and has a multilayer structure in which a waveguide is arranged between the lower cladding layer and the upper cladding layer. LiDAR uses an optical antenna array in which a plurality of such optical antennas are arranged to adjust a direction of light emission.

For example, the optical antenna includes a waveguide and a diffraction grating placed on both sides of the waveguide, and emits light from the diffraction grating. The diffraction grating is made of the same layer as the waveguide, and with such a structure, it is possible to simplify the manufacture of the optical antenna.

A top surface emission rate is used as a main characteristic index of the optical antenna, but in the optical antenna, since the surroundings of the waveguide and the diffraction grating are vertically symmetrical in a thickness direction, equal amounts of light are emitted to the top and bottom surfaces, resulting in low emission efficiency.

In view of the above points, an object of the present disclosure is to provide an optical antenna and an optical antenna array with high emission efficiency.

In order to achieve the above object, according to one aspect of the present disclosure, an optical antenna includes a waveguide for propagating light, when a direction in which the waveguide extends is defined as a first direction, a direction perpendicular to the first direction is defined as a second direction, and a direction perpendicular to both the first direction and the second direction is defined as a third direction, a first diffraction grating group having a plurality of first diffraction gratings arranged at a predetermined period in the first direction on both sides of the waveguide in the second direction, and a second diffraction grating group having a plurality of second diffraction gratings arranged at the same period as the first diffraction grating in the first direction on both sides of the waveguide in the second direction. The first diffraction grating and the second diffraction grating have different centroid positions in the first direction and the third direction, and the second diffraction grating is located closer to the waveguide than the first diffraction grating in the second direction.

According to this configuration, it becomes possible to arrange the first diffraction grating and the second diffraction grating at a location where the electric field strength is the same, and the light amount of the emitted light from the first diffraction grating and the second diffraction grating can be made equal. Furthermore, the phases of the emitted light from the first diffraction grating and the second diffraction grating on one side in the third direction can be made equal. Moreover, the phases of the emitted light from the first diffraction grating and the second diffraction grating on the other side in the third direction can be set to be opposite phases to each other. In this way, by aligning the light amounts and phases of the emitted light from the first diffraction grating and the second diffraction grating on one side in the third direction, these emitted lights can efficiently strengthen each other. On the other hand, on the other side in the third direction, the phases of the emitted lights from the first diffraction grating and the second diffraction grating are set to be opposite, so that these emitted lights weaken each other. Thereby, the emission efficiency to one side in the third direction can be improved.

Hereinafter, embodiments of the present disclosure will be described with reference to the drawings. In the following embodiments, the same or equivalent parts are denoted by the same reference numerals as each other, and explanations will be provided to the same reference numerals.

First Embodiment

A first embodiment will be described. An optical antenna 10 of the present embodiment shown in FIG. 1 is applied to, for example, a laser radar, an FMCW (Frequency Modulated Continuous Wave) type LiDAR, and the like.

Figure 2:
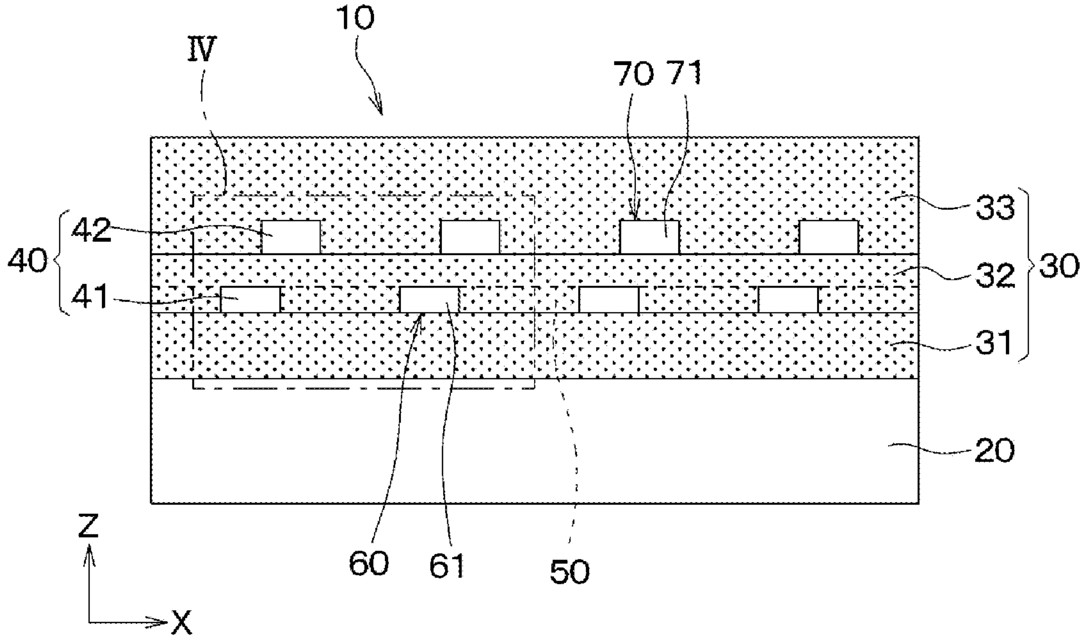
FIG. 2 is a sectional view taken along a line II-II of FIG. 1.

As shown in FIGS. 1 and 2, the optical antenna 10 includes a substrate 20, a cladding layer 30, and a core layer 40 laminated on the substrate 20. Further, the optical antenna 10 includes a waveguide 50, a first diffraction grating group 60, and a second diffraction grating group 70, and the waveguide 50, the first diffraction grating group 60, and the second diffraction grating group 70 are constituted by a part of the core layer 40. FIG. 1 omits an illustration of the cladding layer 30.

One direction parallel to a top surface of the substrate 20 is defined as a X direction, and a direction parallel to the top surface of the substrate 20 and perpendicular to the X direction is defined as a Y direction. A direction perpendicular to both the X direction and the Y direction is defined as a Z direction. The X direction is the direction in which the waveguide 50 extends, and the Y direction is the width direction of the waveguide 50. The Z direction is a lamination direction of the cladding layer 30 and the core layer 40 and a thickness direction of the waveguide 50. The X direction corresponds to a first direction, the Y direction corresponds to a second direction, and the Z direction corresponds to a third direction.

The substrate 20 is made of silicon (Si) or the like. The cladding layer 30 includes a first cladding layer 31, a second cladding layer 32, and a third cladding layer 33, each of which is made of an insulating film such as a silicon oxide film ($SiO2$). The first cladding layer 31, the second cladding layer 32, and the third cladding layer 33 are laminated in order on the top surface of the substrate 20.

The core layer 40 includes a first core layer 41 and a second core layer 42, each of which is made of a Si film. The first core layer 41 is laminated on the top surface of the first cladding layer 31, and is patterned into a predetermined shape. The second cladding layer 32 is formed to cover the top surface of the first cladding layer 31 exposed from the first core layer 41 and the first core layer 41. The second core layer 42 is laminated on the top surface of the second cladding layer 32, and is patterned into a predetermined shape. The third cladding layer 33 is formed to cover the top surface of the second cladding layer 32 exposed from the second core layer 42 and the second core layer 42.

In this way, the optical antenna 10 has a multilayer structure including a plurality of films laminated on the substrate 20. The first diffraction grating group 60 is composed of films on the same level as the waveguide 50, and the second diffraction grating group 70 is composed of films on a different level from the waveguide 50.

Specifically, the first core layer 41 is patterned to include a linear portion extending in the X direction, and the waveguide 50 is configured by this linear portion. The waveguide 50 is for propagating the light input to the optical antenna 10.

Further, the first core layer 41 is patterned to include a plurality of rectangular plate-shaped portions arranged on both sides of the waveguide 50 in the Y direction, and the first diffraction grating group 60 is composed of the plurality of rectangular plate-shaped portions. The first diffraction grating group 60 is for emitting light propagating through the waveguide 50 to the outside of the waveguide 50.

The plurality of rectangular plate-shaped portions constituting the first diffraction grating group 60 are each referred to as a first diffraction grating 61. The top surface of the first diffraction grating 61 has a rectangular shape with two sides parallel to the X direction and two sides parallel to the Y direction. Among the plurality of first diffraction gratings 61, the first diffraction grating 61 placed on one side in the Y direction with respect to the waveguide 50 is referred to as the first diffraction grating 611, and the first diffraction grating 61 placed on the other side in the Y direction with respect to the waveguide 50 is referred to as the first diffraction grating 612. The first diffraction gratings 611 and 612 correspond to a first one side diffraction grating and a first other side diffraction grating, respectively. The first diffraction gratings 611 and 612 are placed apart from the waveguide 50.

The first diffraction grating 611 is arranged periodically at a constant pitch in the X direction. The first diffraction grating 612 is periodically arranged at the same pitch as the first diffraction grating 611 in the X direction. In the first diffraction grating group 60, a plurality of first diffraction grating pairs 62 each including one first diffraction grating 611 and one first diffraction grating 612 are arranged. In each first diffraction grating pair 62, the first diffraction grating 611 and the first diffraction grating 612 are arranged at the same position in the X direction so as to face each other with the waveguide 50 in between.

The second core layer 42 is patterned to include a plurality of rectangular plate-shaped portions arranged on both sides of the waveguide 50 in the Y direction, and the second diffraction grating group 70 is composed of the plurality of rectangular plate-shaped portions. The second diffraction grating group 70 is for emitting light propagating through the waveguide 50 to the outside of the waveguide 50.

The plurality of rectangular plate-shaped portions constituting the second diffraction grating group 70 are each referred to as a second diffraction grating 71. The top surface of the second diffraction grating 71 has a rectangular shape with two sides parallel to the X direction and two sides parallel to the Y direction. Among the plurality of second diffraction gratings 71, the second diffraction grating 71 placed on one side in the Y direction with respect to the waveguide 50 is referred to as the second diffraction grating 711, and the second diffraction grating 71 placed on the other side in the Y direction with respect to the waveguide 50 is referred to as the second diffraction grating 712. The second diffraction gratings 711 and 712 correspond to a second one side diffraction grating and a second other side diffraction grating, respectively.

The second cladding layer 32 is disposed between the second core layer 42 forming the second diffraction gratings 711 and 712 and the first core layer 41 forming the waveguide 50 and the first diffraction gratings 611 and 612. Therefore, the second diffraction gratings 711 and 712 are placed apart from the waveguide 50 and the first diffraction gratings 611 and 612.

The second diffraction grating 711 is arranged periodically at a constant pitch in the X direction. The second diffraction grating 712 is periodically arranged at the same pitch as the second diffraction grating 711 in the X direction. In the second diffraction grating group 70, a plurality of second diffraction grating pairs 72 each including one second diffraction grating 711 and one second diffraction grating 712 are arranged. In each second diffraction grating pair 72, the second diffraction grating 711 and the second diffraction grating 712 are arranged at the same position in the X direction so as to face each other with the waveguide 50 in between.

Figure 3:
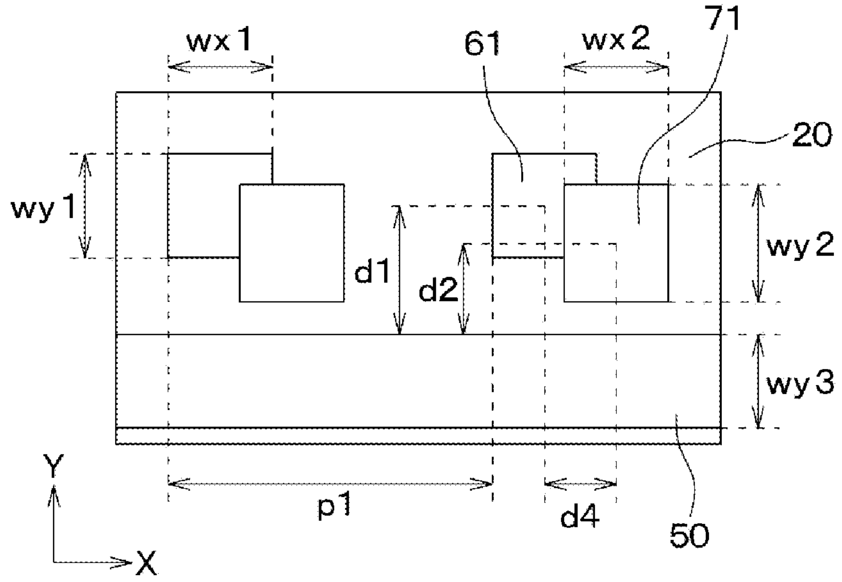
FIG. 3 is an enlarged view of a portion III in FIG. 1.
Figure 4:
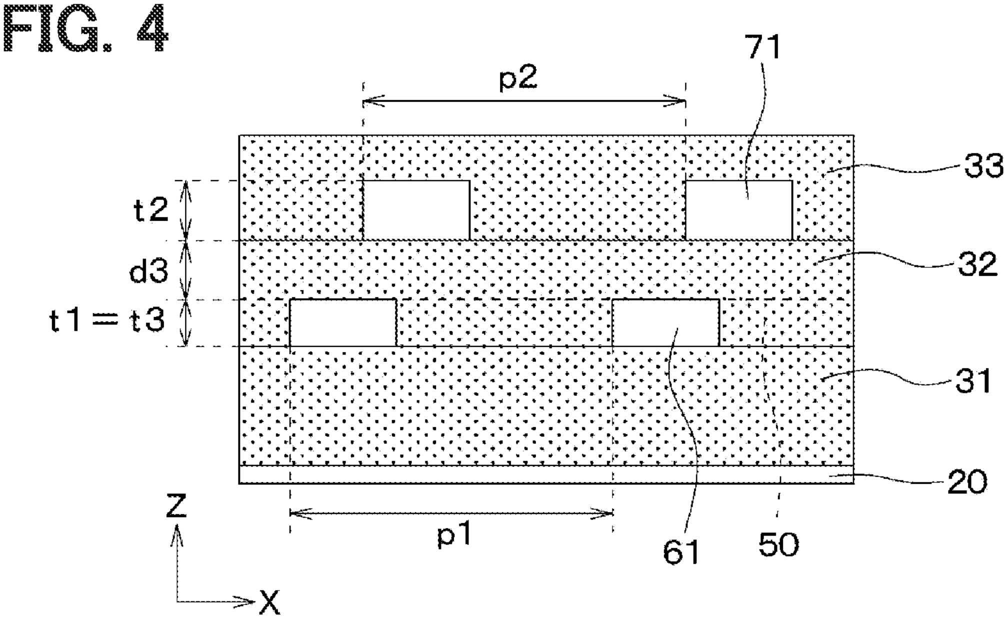
FIG. 4 is an enlarged view of a portion IV in FIG. 2.

As shown in FIGS. 3 and 4, the pitches of the first diffraction grating 61 and the second diffraction grating 71 in the X direction are defined as p1 and p2, respectively. The widths of the first diffraction grating 61 in the X direction and Y direction are respectively defined as wx1 and wy1, a thickness of the first diffraction grating 61, that is, the width in the Z direction is defined as t1, and a distance between a center of the first diffraction grating 61 and a side surface of the waveguide 50 in the Y direction is defined as d1. The widths of the second diffraction grating 71 in the X direction and the Y direction are respectively defined as wx2 and wy2, a thickness of the second diffraction grating 71 is defined as t2, and a distance between a center of the second diffraction grating 71 and a side surface of the waveguide 50 in the Y direction is defined as d2. A distance in the Z direction between the waveguide 50 and the first diffraction grating 61 and the second diffraction grating 71 is defined as d3, a width of the waveguide 50 in the Y direction is defined as wy3, a thickness of the waveguide 50 is defined as t3, and a distance between a center of the first diffraction grating 61 and a center of the second diffraction grating 71 in the X direction is defined as d4.

In the present embodiment, p1 is equal to p2 (p1=p2). That is, the first diffraction grating 61 and the second diffraction grating 71 are arranged at the same period in the X direction. However, the first diffraction grating 61 and the second diffraction grating 71 have different centroid positions in the X direction, and the second diffraction grating pair 72 is arranged at a position shifted to one side in the X direction with respect to the first diffraction grating pair 62.

Further, the first diffraction grating 61 and the second diffraction grating 71 have different centroid positions in the Y direction, and the second diffraction grating 71 is located closer to the waveguide 50 than the first diffraction grating 61 in the Y direction.

Further, the first diffraction grating 61 and the second diffraction grating 71 have different centroid positions in the Z direction, and the second diffraction grating 71 is formed of a part of the second core layer 42 located above the first core layer 41. Therefore, the centroid position of the second diffraction grating 71 is located at the top in the Z direction with respect to the waveguide 50.

When using the optical antenna 10 for LiDAR, a light source (not shown) is connected to the optical antenna 10 so that light from the light source is input to the waveguide 50. Thereby, the light input to the waveguide 50 is emitted from the first diffraction grating group 60 and the second diffraction grating group 70 to the outside of the optical antenna 10. When there is an object within the LiDAR detection range, an object is detected by receiving reflected light from the object with a light receiving element and analyzing the received signal generated thereby.

When using the optical antenna 10 in this manner, it is desirable that the intensity of the emitted light be high in order to accurately detect the object. In the present embodiment, the light emitted by the first diffraction grating group 60 and the light emitted by the second diffraction grating group 70 strengthen each other, so that the first diffraction grating group 60 and the second diffraction grating group 70 are arranged so that the amount of light emitted upward in the entire optical antenna 10 is large.

Specifically, when light in a 0th-order mode, that is, a fundamental mode, propagates through the waveguide 50, the first diffraction grating 61 and the second diffraction grating 71 are arranged so that the electric field strength at the position of the first diffraction grating 61 and the electric field strength at the position of the second diffraction grating 71 are equal.

Figure 5:
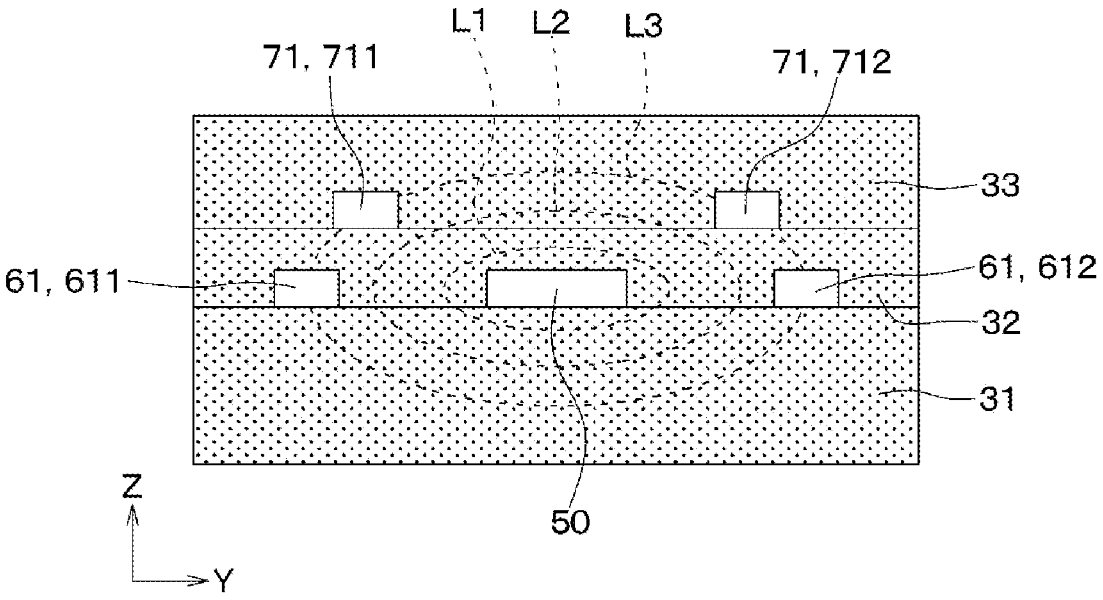
FIG. 5 is a cross-sectional view taken along a line V-V of FIG. 1.

When the light in the 0th-order mode propagates through the waveguide 50, the electric field strength around the waveguide 50 becomes as shown in FIG. 5. That is, the electric field strength is distributed so that concentric elliptical contour lines L1, L2, and L3 are drawn around the waveguide 50. The first diffraction grating 61 and the second diffraction grating 71 are arranged on the contour line L3 having the same electric field strength. In FIG. 5, illustration of the substrate 20 is omitted.

In this way, when the first diffraction grating 61 and the second diffraction grating 71 are placed at the same electric field strength, the intensity of the light emitted from the first diffraction grating group 60 and the light emitted from the second diffraction grating group 70 are equal. Therefore, the effect of these emitted lights reinforcing each other becomes high.

Further, the positions of the first diffraction grating 61 and the second diffraction grating 71 in the X direction and the Z direction are set so that on one side in the Z direction, the phases of the emitted light from the first diffraction grating group 60 and the emitted light from the second diffraction grating group 70 become equal, and on the other side in the Z direction, the phases of these emitted lights are opposite to each other.

Specifically, due to a difference between the timing at which light propagates near the first diffraction grating 61 in the waveguide 50 and the timing at which light propagates near the second diffraction grating 71 in the waveguide 50, a phase difference occurs between the light emitted from the first diffraction grating group 60 and the light emitted from the second diffraction grating group 70. Furthermore, due to the distance between the first diffraction grating 61 and the second diffraction grating 71 in the Z direction, a phase difference occurs between the light emitted from the first diffraction grating group 60 and the light emitted from the second diffraction grating group 70. The first diffraction grating 61 and the second diffraction grating 71 are arranged so that their phase differences cancel each other out in the upper part in the Z direction. By arranging the first diffraction grating 61 and the second diffraction grating 71 in this way, the phases of these emitted lights become opposite to each other in the lower part in the Z direction.

In this way, the phases of the emitted light from the first diffraction grating group 60 and the emitted light from the second diffraction grating group 70 are aligned in the upper part of the Z direction, and the phases of these emitted lights become opposite to each other in the lower part of the Z direction. This increases the effect that these emitted lights strengthen each other in the upper part of the optical antenna 10.

Theoretically, when the first diffraction grating 61 and the second diffraction grating 71 are shifted by ¼ wavelength of the input light in the X direction and the Z direction, the phases of the emitted light are aligned, but in reality, it is possible to investigate the positions where the phases align through the simulation. In addition, with respect to the other dimensions and positions mentioned above, it is possible to investigate numerical values in which the emitted light efficiently strengthens each other through the simulation.

In a simulation conducted by the present discloser, when the dimensions of the waveguide 50, the first diffraction grating 61, and the second diffraction grating 71 are set as follows, for example, the emission efficiency to the top surface becomes high. That is, wx1 is 200 nm, wy1 is 200 nm, p1 is 630 nm, t1 is 210 nm, and d1 is 425 nm. Moreover, wx2 is 200 nm, wy2 is 200 nm, p2 is 630 nm, t2 is 210 nm, and d2 is 280 nm. Further, d3 is 50 nm, wy3 is 480 nm, t3 is 210 nm, and d4 is 155 nm.

The emission efficiency to the top surface was evaluated using the top surface emission rate. The top surface emission rate is a ratio of the intensity Pup to the sum of the intensity Pup of the emitted light in the direction of the top surface and the intensity Pdown of the emitted light in the direction of the bottom surface, and is calculated by Pup/(Pup+Pdown). When the dimensions of the first diffraction grating 61 and the like were set as described above, the top surface emission rate was 0.96.

Figure 6:
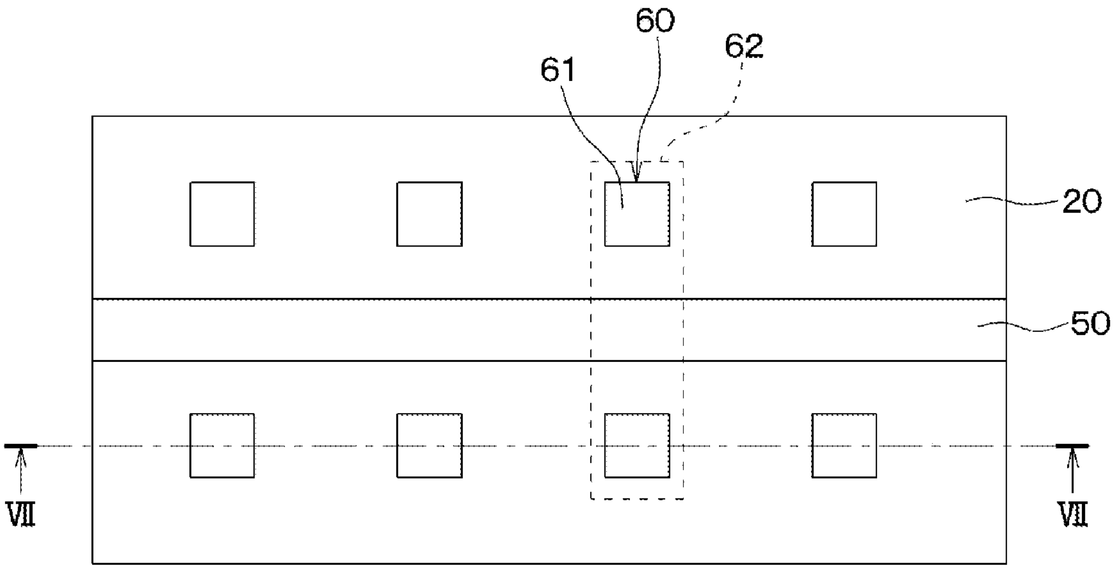
FIG. 6 is a top view of a comparative example.
Figure 7:
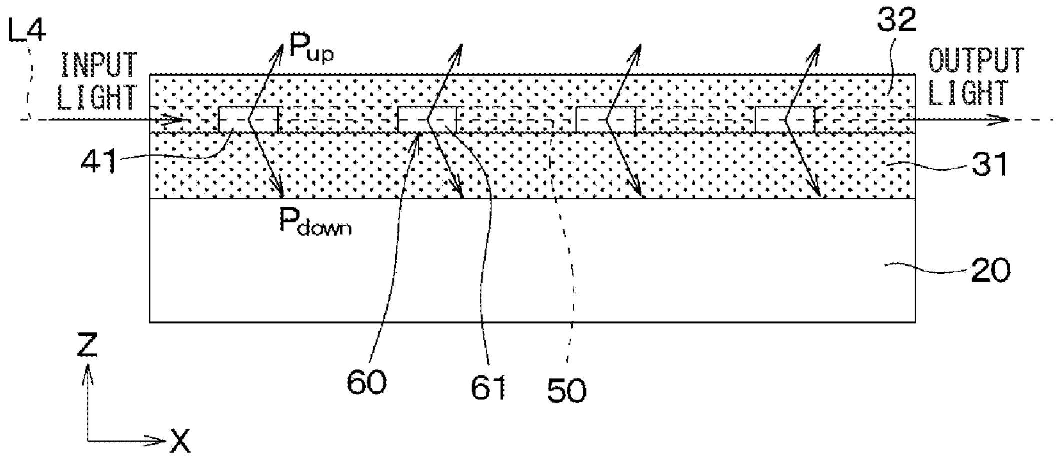
FIG. 7 is a sectional view taken along a line VII-VII in FIG. 6.

In a comparative example shown in FIGS. 6 and 7, the second diffraction grating group 70 is not formed, and the only diffraction grating is the first diffraction grating group 60 in the same layer as the waveguide 50. As a result, the cross-sectional view around the waveguide 50 is vertically symmetrical with respect to a horizontal plane indicated by a straight line L4, so that the same amount of light is emitted to the top surface and the bottom surface, and the top surface emission rate becomes 0.50. In this way, in the present embodiment, the emission efficiency to the upper surface is higher than that in the comparative example.

Figure 8:
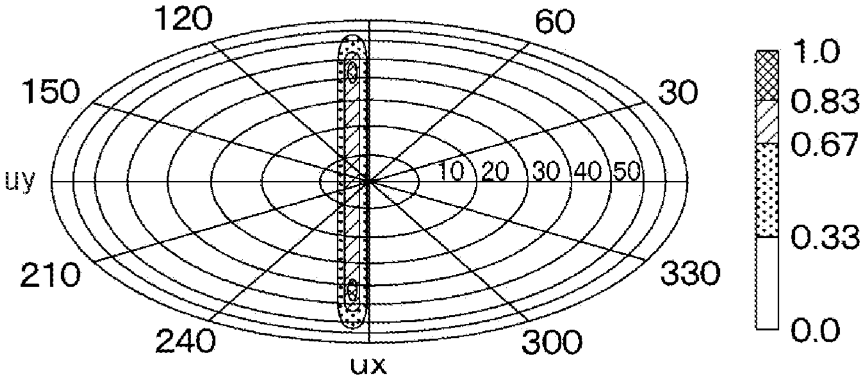
FIG. 8 is a FFP (Far Field Pattern) of the first embodiment.
Figure 9:
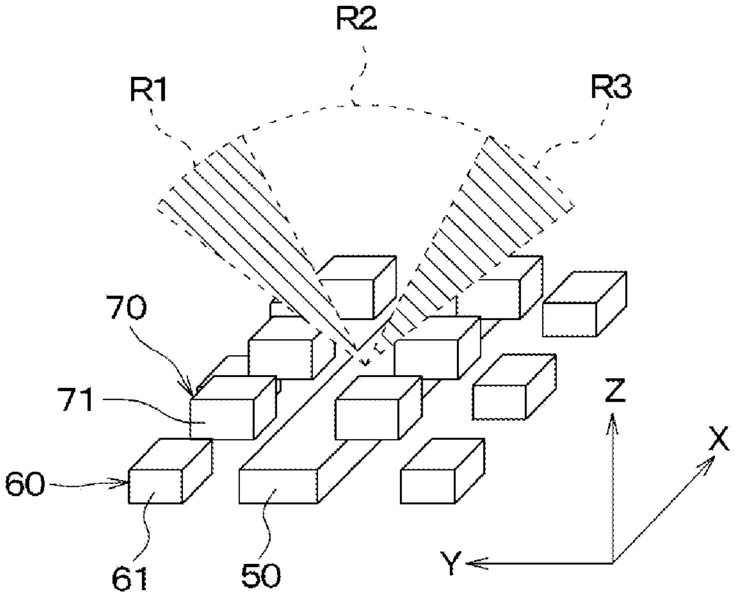
FIG. 9 is a perspective view showing a beam shape of the first embodiment.

A beam shape of the emitted light in the present embodiment is as shown in FIGS. 8 and 9. That is, while the emitted light spreads on both sides in the Y direction, the emitted light is not tilted in the X direction and is emitted upward along the YZ plane. The emitted light has peaks on one side and the other side in the Y direction. That is, the emitted light has a beam shape having two peaks. In addition, in FIG. 8, the numerical value of the light strength is normalized by the maximum value. In addition, in FIG. 9, the beam emission region is divided into three regions R1, R2, and R3, and a hatching indicates that among the regions R1 to R3, regions R1 and R3 located on both sides of a center region R2 in the Y direction have a large amount of light. Further, in FIG. 9, illustration of the substrate 20 and cladding layer 30 is omitted. Such a beam shape is advantageous, for example, when it is desired to increase the scanning angle of LiDAR or when it is desired to detect objects in two directions at the same time.

As explained above, in the present embodiment, the second diffraction gratings 71 are arranged on both sides of the waveguide 50 in the Y direction with the same period as the first diffraction grating 61 in the X direction. The centroid positions of the first diffraction grating 61 and the second diffraction grating 71 are different from each other in the X direction and the Z direction, and the second diffraction grating 71 is located closer to the waveguide 50 than the first diffraction grating 61 in the Y direction.

Thereby, it becomes possible to arrange the first diffraction grating 61 and the second diffraction grating 71 at a location where the electric field strength is the same, and the light amount of the emitted light from the first diffraction grating 61 and the second diffraction grating 71 can be made equal. Furthermore, the phases of the emitted light from the first diffraction grating 61 and the second diffraction grating 71 on one side in the Z direction can be made equal. Moreover, the phases of the emitted light from the first diffraction grating 61 and the second diffraction grating 71 on the other side in the Z direction can be set to be opposite phases to each other. On one side in the Z direction, the light amount and phase of the emitted light from the first diffraction grating 61 and the second diffraction grating 71 are made equal, and on the other side thereof, these emitted lights are made to have opposite phases. As a result, these emitted lights can efficiently strengthen each other on one side in the Z direction, making it possible to improve the emission efficiency.

According to the embodiment described above, it is possible to achieve the following advantageous effects.

(1) The waveguide 50, the first diffraction grating 61, and the second diffraction grating 71 are made up of parts of a plurality of films laminated on the substrate 20. The first diffraction grating 61 is composed of the first core layer 41 that is a film on the same layer as the waveguide 50, and the second diffraction grating 71 is composed of the second core layer 41 that is a film in a different layer from that of the waveguide 50. According to this configuration, since the waveguide 50, the first diffraction grating group 60, and the second diffraction grating group 70 can be configured with two layers, the first core layer 41 and the second core layer 42, manufacturing of the optical antenna 10 becomes easier.

(2) The centroid position of the second diffraction grating 71 is located at the top in the Z direction with respect to the waveguide 50. By arranging the first diffraction grating 61 and the second diffraction grating 71 as described above in the X direction and the Y direction, and arranging the second diffraction grating 71 at the top with respect to the waveguide 50 in the Z direction, the phases of the emitted light from the first diffraction grating 61 and the second diffraction grating 71 can be made equal in the upper part in the Z direction. Therefore, the emission efficiency of the emitted light to the top surface can be improved. Furthermore, manufacturing of the optical antenna 10 is easier than in the case where the second diffraction grating 71 is formed at the bottom with respect to the waveguide 50 and the first diffraction grating 61.

(3) The first diffraction grating 61 and the second diffraction grating 71 are made of the same material. According to this configuration, the first diffraction grating 61 and the second diffraction grating 71 can be formed by the same semiconductor process, so manufacturing of the optical antenna 10 becomes easy.

Second Embodiment

A second embodiment will be described. The present embodiment differs from the first embodiment in that the material of the second diffraction grating 71 is changed, and other aspects are the same as the first embodiment, so only the different parts from the first embodiment will be described.

The second diffraction grating 71 of the present embodiment is made of a material having a lower refractive index than the waveguide 50 and the first diffraction grating 61. Specifically, the second core layer 42 of the present embodiment is made of silicon nitride (SiN). That is, while the waveguide 50 and the first diffraction grating 61 are made of Si, the second diffraction grating 71 is made of SiN, which has a lower refractive index than Si.

Figure 10:
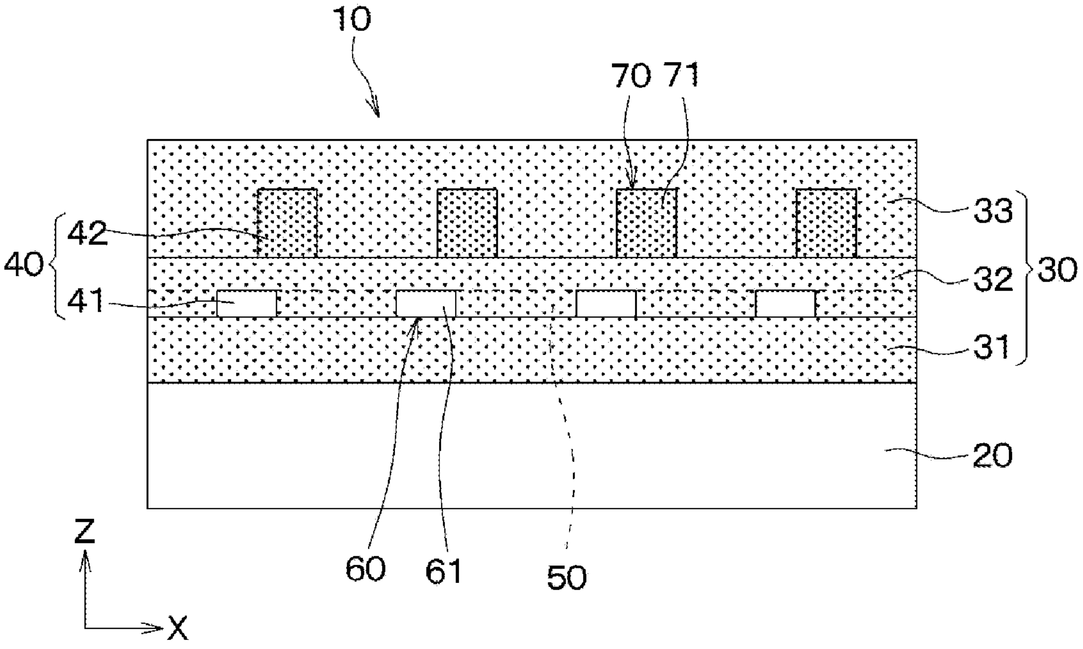
FIG. 10 is a sectional view of an optical antenna according to a second embodiment, and is a diagram corresponding to FIG. 2.

Since the refractive index of the second diffraction grating group 70 becomes lower than the refractive index of the first diffraction grating group 60, light is less likely to be emitted from the second diffraction grating group 70. Therefore, in the present embodiment, in order to equalize the amount of light of the emitted light from the first diffraction grating group 60 and the emitted light from the second diffraction grating group 70, as shown in FIG. 10, the thickness of the second diffraction grating 71, that is, the thickness of the second core layer 42, is made larger than that of the first embodiment. Further, the thickness of the second diffraction grating 71 is made larger than the thickness of the waveguide 50 and the thickness of the first diffraction grating 61.

In the present embodiment as well, it is possible to investigate the dimensions that increase the top surface emission rate by simulation. In a simulation conducted by the present discloser, when the dimensions of the waveguide 50, the first diffraction grating 61, and the second diffraction grating 71 are set as follows, for example, the emission efficiency to the top surface becomes high. That is, wx1 is 220 nm, wy1 is 200 nm, p1 is 630 nm, t1 is 210 nm, and d1 is 450 nm. Moreover, wx2 is 325 nm, wy2 is 400 nm, p2 is 630 nm, t2 is 300 nm, and d2 is 265 nm. Further, d3 is 50 nm, wy3 is 480 nm, t3 is 210 nm, and d4 is 115 nm. When the dimensions of the first diffraction grating 61 were set as described above, the top surface emission rate was 0.93, which was higher than that of the comparative example of the first embodiment.

Figure 11:
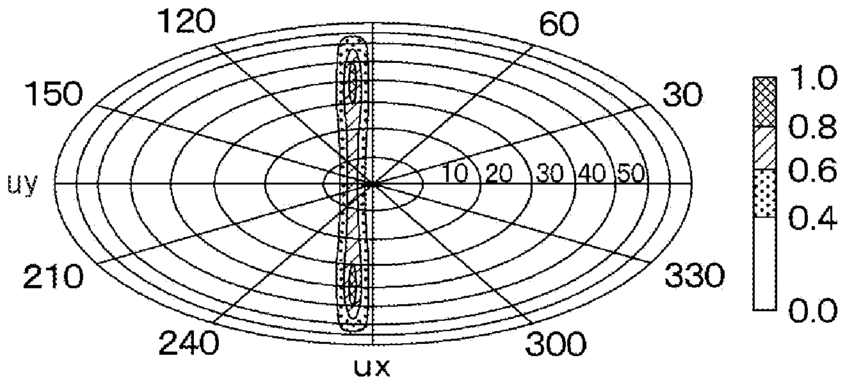
FIG. 11 shows a FFP according to the second embodiment.

In addition, also in the present embodiment, a beam shape having two peaks was obtained, as shown in FIG. 11.

In the present embodiment, it is possible to achieve the advantageous effects as similar to the effects in the first embodiment with the configuration and operation identical to the ones in the first embodiment.

According to the embodiment described above, it is possible to achieve the following advantageous effects.

(1) The second diffraction grating 71 is made of a material having a lower refractive index than the waveguide 50 and the first diffraction grating 61. According to this configuration, since light is less likely to be emitted from the second diffraction grating group 70 than from the first diffraction grating group 60, even if the second diffraction grating 71 is formed thicker than the first diffraction grating 61, the amount of light intensity emitted from the first diffraction grating group 60 and the light emitted from the second diffraction grating group 70 can be made equal. By increasing the thickness of the second diffraction grating 71, the formation of the second diffraction grating 71 is easier than when the second diffraction grating 71 is formed thin. Further, since the resolution required of an exposure apparatus or the like used for patterning the second core layer 42 is lowered, the manufacturing cost of the piezoelectric element can be reduced.

Third Embodiment

A third embodiment will be described. The present embodiment differs from the second embodiment in that the positions of the first diffraction grating 612 and the second diffraction grating 712 are changed, and other aspects are the same as in the second embodiment, so only the different parts from the second embodiment will be explained.

Figure 12:
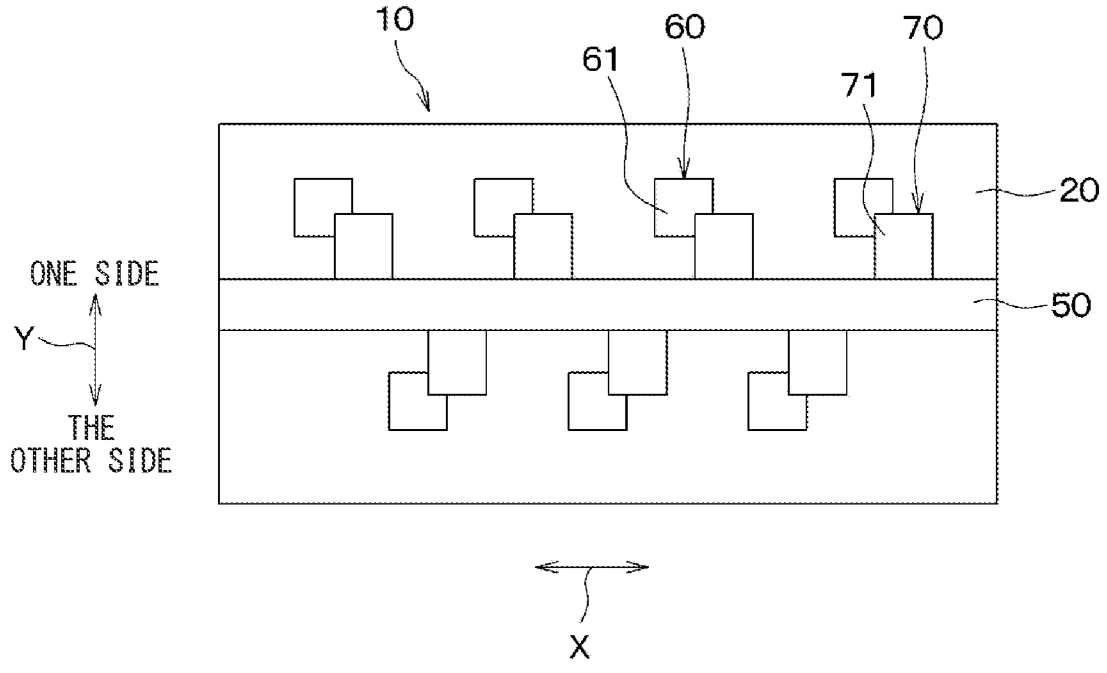
FIG. 12 is a top view of the optical antenna according to a third embodiment.

As shown in FIG. 12, in the present embodiment, the plurality of first diffraction gratings 612 are arranged offset in the X direction with respect to the plurality of first diffraction gratings 611. Further, the plurality of second diffraction gratings 712 are arranged offset in the X direction with respect to the plurality of second diffraction gratings 711.

The amount of offset of the first diffraction grating 612 with respect to the first diffraction grating 611 is equal to the amount of offset of the second diffraction grating 712 with respect to the second diffraction grating 711. Specifically, the amount of offset of the first diffraction grating 612 with respect to the first diffraction grating 611 and the amount of offset of the second diffraction grating 712 with respect to the second diffraction grating 711 are set to half the period of the first diffraction grating 61 and the second diffraction grating 71 in the X direction.

In the present embodiment as well, it is possible to investigate the dimensions that increase the top surface emission rate by simulation. In the present embodiment, when the distances d1 and d2 are made smaller than those in the first and second embodiments, the emission efficiency to the top surface is increased. Specifically, when the dimensions of the waveguide 50, the first diffraction grating 61, and the second diffraction grating 71 are set as follows, for example, the emission efficiency to the top surface becomes high. That is, wx1 is 200 nm, wy1 is 300 nm, p1 is 630 nm, t1 is 210 nm, and d1 is 375 nm. Moreover, wx2 is 365 nm, wy2 is 400 nm, p2 is 630 nm, t2 is 300 nm, and d2 is 165 nm. Further, d3 is 50 nm, wy3 is 650 nm, t3 is 210 nm, and d4 is 130 nm. When the dimensions of the first diffraction grating 61 were set as described above, the top surface emission rate was 0.91, which was higher than that of the comparative example of the first embodiment.

Figure 13:
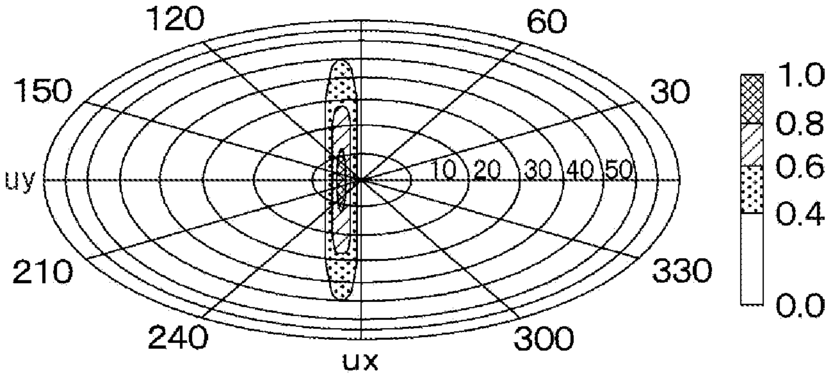
FIG. 13 shows a FFP according to the third embodiment.
Figure 14:
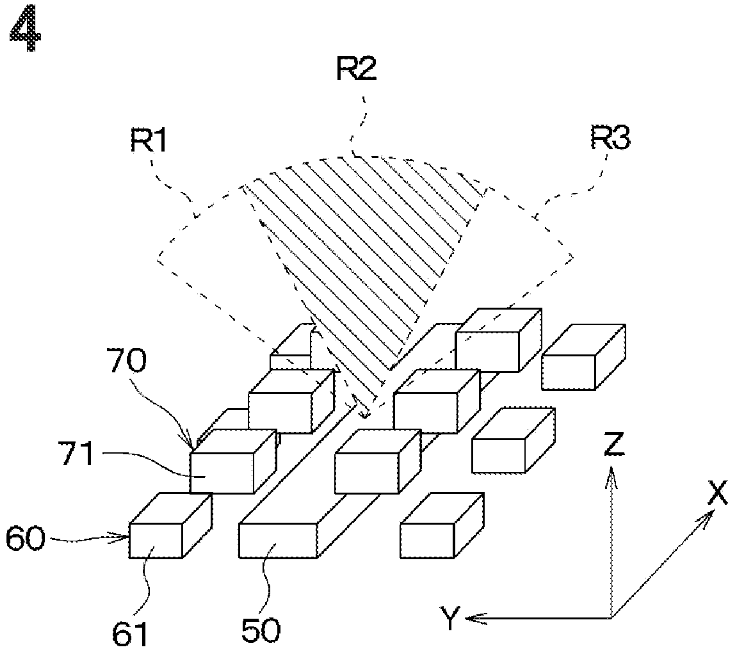
FIG. 14 is a perspective view showing the beam shape of the third embodiment.

When the first diffraction gratings 611, 612 and the second diffraction gratings 711, 712 are arranged in this way, the phases of the lights emitted from both sides of the waveguide 50 in the Y direction are shifted and they strengthen each other at the center in the Y direction. So, as shown in FIGS. 13 and 14, a beam shape having one peak is obtained. That is, while the emitted light spreads on both sides in the Y direction, the emitted light is not tilted in the X direction and is emitted upward along the YZ plane. The emitted light has a peak in a region R2, which is the central portion in the Y direction. With such a configuration in which a beam shape having one peak is obtained, the optical antenna 10 becomes easier to use. Moreover, high intensity emitted light can be obtained.

In the present embodiment, it is possible to attain the advantageous effects as similar to the effects in the first and second embodiments with the configuration and operation identical to the ones in the first and second embodiments.

According to the embodiment described above, it is possible to achieve the following advantageous effects.

(1) The plurality of first diffraction gratings 612 are arranged offset in the X direction with respect to the plurality of first diffraction gratings 611. Further, the plurality of second diffraction gratings 712 are arranged offset in the X direction with respect to the plurality of second diffraction gratings 711. The amount of offset of the first diffraction grating 612 with respect to the first diffraction grating 611 is equal to the amount of offset of the second diffraction grating 712 with respect to the second diffraction grating 711. According to this configuration, a beam shape having one peak can be obtained simply by offsetting the first diffraction grating 612 and the second diffraction grating 712, so the intensity of the emitted light can be increased with a simple method.

(2) The amount of offset of the first diffraction grating 612 with respect to the first diffraction grating 611 and the amount of offset of the second diffraction grating 712 with respect to the second diffraction granting 711 are set to half the period of the first diffraction grating 61 and the second diffraction grating 71 in the X direction. According to this configuration, the emitted light from the first diffraction grating 611 and the second diffraction grating 711 and the emitted light from the first diffraction grating 612 and the second diffraction grating 712 efficiently strengthen each other in the region R2, so that the intensity of the emitted light can be further increased.

Fourth Embodiment

A fourth embodiment will be described. In the present embodiment, the number of optical antennas 10 is changed from that in the first embodiment, and other aspects are the same as in the first embodiment, so only the different parts from the first embodiment will be described.

Figure 15:
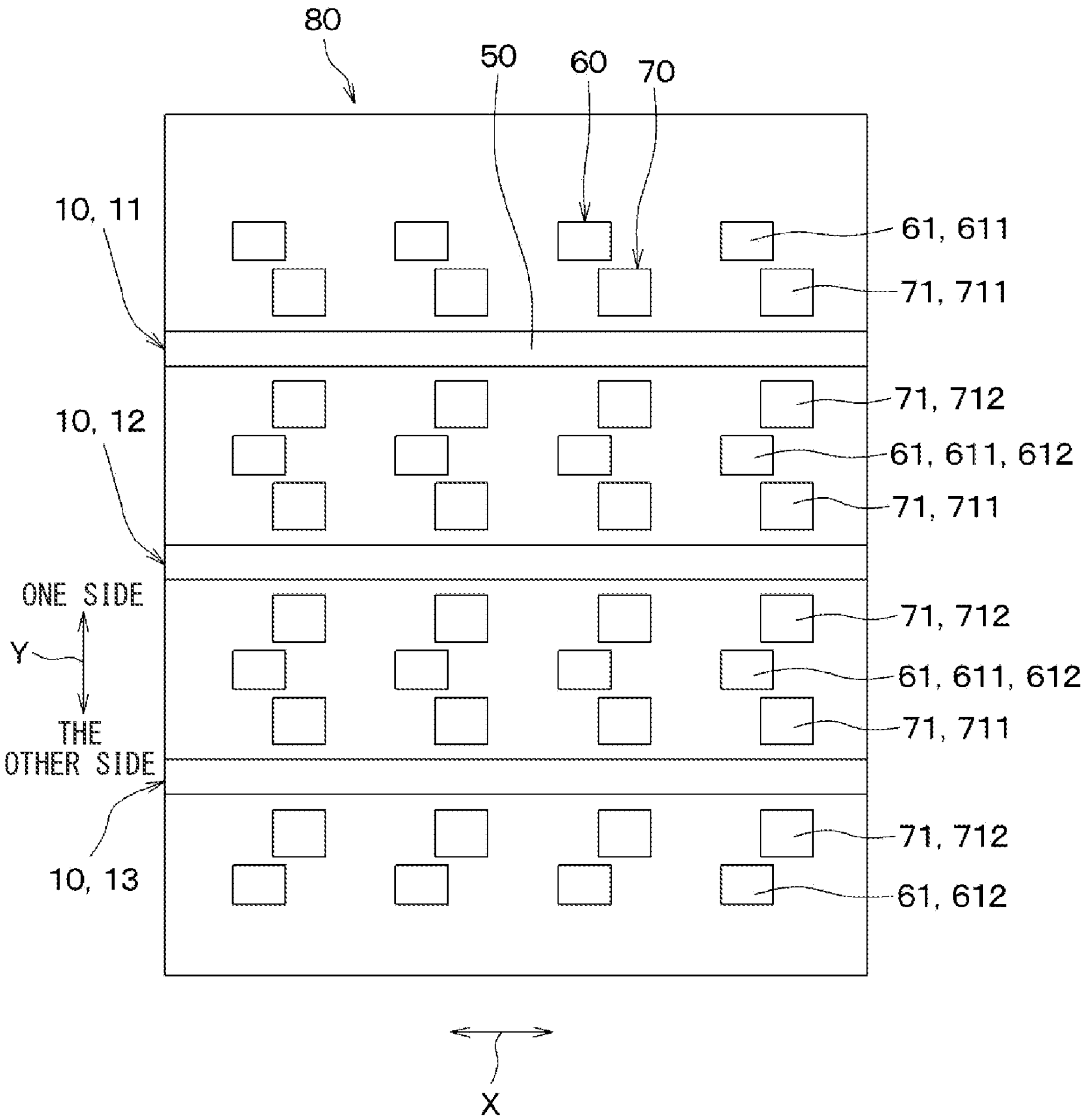
FIG. 15 is a top view of the optical antenna array according to a fourth embodiment.

The optical antenna array 80 shown in FIG. 15 is composed of a plurality of optical antennas 10. In the present embodiment, a case where the optical antenna array 80 includes three optical antennas 10 will be described as an example. The three optical antennas 10 are referred to as optical antennas 11, 12, and 13, respectively.

The waveguides 50 included in the optical antennas 11 to 13 are arranged in order from one side in the Y direction. The first diffraction grating 612 and the second diffraction grating 712 of the optical antenna 11 and the first diffraction grating 611 and the second diffraction grating 711 of the optical antenna 12 are placed between the waveguide 50 of the optical antenna 11 and the waveguide 50 of the optical antenna 12. Further, the first diffraction grating 612 and the second diffraction grating 712 of the optical antenna 12 and the first diffraction grating 611 and the second diffraction grating 711 of the optical antenna 13 is placed between the waveguide 50 of the optical antenna 12 and the waveguide 50 of the optical antenna 13.

At least two of the plurality of optical antennas 10 included in the optical antenna array 80 share the first diffraction grating 61. Specifically, these two optical antennas 10 share the first diffraction grating group 60 arranged between two adjacent waveguides 50. Between two adjacent waveguides 50, the first diffraction grating group 60 is composed of a plurality of first diffraction gratings 61 arranged in a row in the X direction. This first diffraction grating 61 is a first diffraction grating 611 of one of the two adjacent optical antennas 10 and a first diffraction grating 612 of the other of the two adjacent optical antennas 10.

The second diffraction grating group 70 arranged between two adjacent waveguides 50 is not shared by two adjacent optical antennas 10 and is separated. A second diffraction grating 712 is arranged on one side in the Y direction with respect to the first diffraction gratings 61 arranged in a row, and a second diffraction grating 712 is arranged on the other side in the Y direction with respect to the first diffraction grating 61.

In the present embodiment, the optical antenna 11 and the optical antenna 12 share the first diffraction grating 61, and the optical antenna 12 and the optical antenna 13 share the first diffraction grating 61.

That is, the first diffraction grating 61 disposed between the waveguide 50 of the optical antenna 11 and the waveguide 50 of the optical antenna 12 is the first diffraction grating 612 of the optical antenna 11 and the first diffraction grating 611 of the optical antenna 12. Further, the first diffraction grating 61 disposed between the waveguide 50 of the optical antenna 12 and the waveguide 50 of the optical antenna 13 is the first diffraction grating 612 of the optical antenna 12 and the first diffraction grating 611 of the optical antenna 13.

When using the optical antenna array 80 for LiDAR, a light source (not shown) is connected to the optical antenna array 80 via a waveguide that branches into a plurality of portions, and the light output from the light source is transmitted to the waveguides 50 of the optical antennas 11 to 13. A phase shifter is arranged in each branched waveguide to adjust the phase of the light input to the optical antennas 11 to 13, thereby controlling the direction of the light emitted from the entire optical antenna array 80.

In the present embodiment, it is possible to achieve the advantageous effects as similar to the effects in the first embodiment with the configuration and operation identical to the ones in the first embodiment.

According to the embodiment described above, it is possible to achieve the following advantageous effects.

(1) The optical antenna array 80 includes a plurality of optical antennas 10. According to this configuration, the emission efficiency of the optical antenna array 80 can be improved.

(2) At least two of the plurality of optical antennas 10 share the first diffraction grating 61. According to this configuration, manufacturing of the optical antenna array 80 becomes easy, and the optical antenna array 80 can be downsized by arranging the optical antennas 10 at a narrow pitch.

OTHER EMBODIMENTS

The present disclosure is not limited to the above-described embodiments, and can be appropriately modified. The embodiments described above are not independent of each other, and can be appropriately combined except when the combination is obviously impossible. The constituent element(s) of each of the above embodiments is/are not necessarily essential unless it is specifically stated that the constituent element(s) is/are essential in the above embodiment, or unless the constituent element(s) is/are obviously essential in principle. A quantity, a value, an amount, a range, or the like referred to in the description of the embodiments described above is not necessarily limited to such a specific value, amount, range or the like unless it is specifically described as essential or understood as being essential in principle. Further, in each of the above-mentioned embodiments, when referring to the shape, positional relationship, and the like of a component and the like, the component is not limited to the shape, positional relationship, and the like, except for the case where the component is specifically specified, the case where the component is fundamentally limited to a specific shape, positional relationship, and the like.

The second diffraction grating group 70 may be arranged below the waveguide 50 and the first diffraction grating group 60. For example, the second core layer 42 constituting the second diffraction grating group 70 may be formed on the top surface of the first cladding layer 31, and the first core layer 41 constituting the waveguide 50 and the first diffraction grating group 60 may be formed on the top surface of the second cladding layer 32. Even in such a configuration, by aligning the amount and phase of the light emitted upward from the first diffraction grating 61 and the second diffraction grating 71, the emission efficiency to the top surface of the substrate 20 can be improved.

In the above embodiments, light in the 0th-order mode has been described, but the emission efficiency of light in the 1st-order mode or higher can also be improved by arranging the first diffraction grating group 60 and the second diffraction grating group 70 in consideration of the electric field intensity distribution.

In the first embodiment, the first diffraction grating 612 and the second diffraction grating 712 may be offset as in the third embodiment. The optical antenna array 80 of the fourth embodiment may be configured using the optical antennas 10 of the second and third embodiments.

The waveguide 50 may have a curved shape instead of a straight shape.

What is claimed is:

1. An optical antenna, comprising:

a substrate, a waveguide laminated on the substrate and configured to propagate light, when a direction in which the waveguide extends is defined as a first direction, a direction perpendicular to the first direction and parallel to a surface of the substrate is defined as a second direction, and a direction perpendicular to both the first direction and the second direction and corresponding to a thickness direction of the substrate is defined as a third direction, a first diffraction grating group having a plurality of first diffraction gratings arranged at a predetermined period in the first direction on both sides of the waveguide in the second direction, and a second diffraction grating group having a plurality of second diffraction gratings arranged at a same period as the first diffraction grating in the first direction on both sides of the waveguide in the second direction, wherein the first diffraction grating group and the second diffraction grating group have different centroid positions in the first direction and the third direction, and the second diffraction grating group is located closer to the waveguide than the first diffraction grating group in the second direction.

2. The optical antenna according to claim 1, wherein the waveguide, the first diffraction grating group, and the second diffraction grating group are composed of parts of a plurality of films laminated on a substrate, the first diffraction grating group is composed of a film on a same layer as the waveguide, and the second diffraction grating group is formed of a film in a layer different from that of the waveguide.

3. The optical antenna according to claim 1, wherein a center of gravity of the second diffraction grating group is located above the waveguide in the third direction.

4. The optical antenna according to claim 1, wherein the waveguide, the first diffraction grating group, and the second diffraction grating group are spaced apart from each other.

5. The optical antenna according to claim 1, wherein the second diffraction grating group is made of a material having a lower refractive index than the waveguide and the first diffraction grating group.

6. The optical antenna according to claim 5, wherein the waveguide and the first diffraction grating group are made of silicon, and the second diffraction grating group is made of silicon nitride.

7. The optical antenna according to claim 1, wherein the first diffraction grating group arranged on one side of the second direction with respect to the waveguide is defined as a first one side diffraction grating group, the first diffraction grating group arranged on the other side of the second direction with respect to the waveguide is defined as a first other side diffraction grating group, the second diffraction grating group arranged on one side of the second direction with respect to the waveguide is defined as a second one side diffraction grating group, the second diffraction grating group disposed on the other side of the second direction with respect to the waveguide is defined as a second other side diffraction grating group, a plurality of first other side diffraction gratings of the first other side diffraction grating group are arranged offset in the first direction with respect to a plurality of first one-side diffraction gratings of the first on side diffraction grating group, a plurality of second other side diffraction gratings of the second other side diffraction grating group are arranged offset in the first direction with respect to the plurality of second one-side diffraction gratings, and an offset amount of the first other side diffraction grating group with respect to the first one side diffraction grating group is equal to the offset amount of the second other side diffraction grating group with respect to the second one side diffraction grating group.

8. The optical antenna according to claim 7, wherein the offset amount of the first other side diffraction group grating with respect to the first one side diffraction grating group and the offset amount of the second other side diffraction grating group with respect to the second one side diffraction grating group are set to half the period of the first diffraction grating group and the second diffraction grating group in the first direction.

9. An optical antenna array, comprising:

a plurality of optical antennas according to claim 1.

10. The optical antenna array according to claim 9, wherein at least two of the plurality of optical antennas share the first diffraction grating.

* * * * *